(12) United States Patent
Kuwahara et al.

(10) Patent No.: US 11,485,092 B2
(45) Date of Patent: Nov. 1, 2022

(54) JOINING BODY

(71) Applicant: Mitshubishi Electric Corporation, Tokyo (JP)

(72) Inventors: Yoshiki Kuwahara, Tokyo (JP); Ryuichi Kitora, Tokyo (JP); Akihiro Yamamura, Tokyo (JP); Shogo Okamoto, Tokyo (JP); Masashi Nakamura, Tokyo (JP); Shinichiro Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 183 days.

(21) Appl. No.: 16/697,971

(22) Filed: Nov. 27, 2019

(65) Prior Publication Data

US 2020/0094486 A1 Mar. 26, 2020

Related U.S. Application Data

(62) Division of application No. 15/501,728, filed as application No. PCT/JP2015/079858 on Oct. 22, 2015, now Pat. No. 10,576,690.

(30) Foreign Application Priority Data

Oct. 27, 2014 (JP) .................................. 2014-218005

(51) Int. Cl.
*B32B 41/00* (2006.01)
*B29C 65/08* (2006.01)
(Continued)

(52) U.S. Cl.
CPC .......... *B29C 65/08* (2013.01); *B29C 65/3476* (2013.01); *B29C 65/562* (2013.01);
(Continued)

(58) Field of Classification Search
CPC ................ B29C 65/08; B29C 66/8322; B29C 66/30325; B29C 66/114; B29C 6/112;
(Continued)

(56) References Cited

U.S. PATENT DOCUMENTS 6,913,666 B1 * 7/2005 Aeschlimann .......... B29C 66/74
411/908
8,922,080 B2 12/2014 Nakagawa et al.
(Continued)

FOREIGN PATENT DOCUMENTS

| JP | 63-114630 A | 5/1988 |
| JP | 2-9620 A | 1/1990 |

(Continued)

OTHER PUBLICATIONS

International Search Report (PCT/ISA/210) dated Jan. 19, 2016, by the Japanese Patent Office as the International Searching Authority for International Application No. PCT/JP2015/079858.
(Continued)

*Primary Examiner* — Michael N Orlando
*Assistant Examiner* — Joshel Rivera
(74) *Attorney, Agent, or Firm* — Buchanan Ingersoll & Rooney PC

(57) ABSTRACT

The present invention is provided with: an insulation holder formed of a thermoplastic resin material and having a first opening; a wire connection ring formed of a thermoplastic resin material and having a second opening; and a joining component inserted astride in the first opening and the second opening, the joining component being formed of a metal material having a higher melting point than those of the thermoplastic resin materials, the joining component having a higher stiffness than those of the insulation holder and the wire connection ring, wherein a welded part is formed by welding in at least a part of an area where each
(Continued)

of the insulation holder and the wire connection ring has contact with the joining component.

8 Claims, 19 Drawing Sheets

(51) Int. Cl.
| | |
|---|---|
| *H02K 3/38* | (2006.01) |
| *H02K 3/50* | (2006.01) |
| *H02K 15/04* | (2006.01) |
| *H02K 3/52* | (2006.01) |
| *B29C 65/00* | (2006.01) |
| *H02K 15/00* | (2006.01) |
| *B29C 65/56* | (2006.01) |
| *B29C 65/34* | (2006.01) |
| *H02K 1/12* | (2006.01) |
| *H02K 15/02* | (2006.01) |
| *F16B 17/00* | (2006.01) |
| *B29K 701/12* | (2006.01) |
| *B29K 705/00* | (2006.01) |
| *B29L 31/00* | (2006.01) |

(52) U.S. Cl.
CPC .......... *B29C 65/564* (2013.01); *B29C 66/112* (2013.01); *B29C 66/114* (2013.01); *B29C 66/21* (2013.01); *B29C 66/30325* (2013.01); *B29C 66/322* (2013.01); *B29C 66/5344* (2013.01); *B29C 66/54* (2013.01); *B29C 66/73921* (2013.01); *B29C 66/742* (2013.01); *B29C 66/8322* (2013.01); *H02K 1/12* (2013.01); *H02K 3/38* (2013.01); *H02K 3/50* (2013.01); *H02K 3/522* (2013.01); *H02K 15/0062* (2013.01); *H02K 15/02* (2013.01); *H02K 15/04* (2013.01); *B29K 2701/12* (2013.01); *B29K 2705/00* (2013.01); *B29L 2031/748* (2013.01); *F16B 17/008* (2013.01); *H02K 2203/09* (2013.01)

(58) Field of Classification Search
CPC ..... B29C 66/54; B29C 65/562; B29C 65/564; B29C 66/21; B29C 66/5344; B29C 66/322; B29C 65/3476; B29C 66/73921; B29C 66/742; B29C 66/112; H02K 3/522; H02K 15/0062; H02K 1/12; H02K 15/02; H02K 3/38; H02K 3/50; H02K 15/04; H02K 2203/09; F16B 17/008; B29K 2701/12; B29K 2705/00; B29L 2031/748
USPC .................. 156/60, 64, 350, 351, 378, 379
See application file for complete search history.

(56) References Cited

U.S. PATENT DOCUMENTS

| | | |
|---|---|---|
| 2003/0201688 A1 | 10/2003 | Yamamura et al. |
| 2008/0199249 A1 | 8/2008 | Clinch et al. |
| 2008/0211332 A1 | 9/2008 | Kataoka et al. |
| 2009/0256349 A1* | 10/2009 | Strubin .................. B29C 66/96 285/21.2 |
| 2010/0033044 A1 | 2/2010 | Isshiki et al. |
| 2010/0313517 A1 | 12/2010 | Clinch et al. |
| 2013/0340239 A1* | 12/2013 | Ueda ................. B29C 66/81423 29/525.06 |
| 2014/0010588 A1 | 1/2014 | Clinch et al. |
| 2014/0237939 A1 | 8/2014 | Clinch et al. |
| 2014/0356053 A1* | 12/2014 | Urayama .............. B29C 65/564 403/270 |
| 2015/0110547 A1 | 4/2015 | Clinch et al. |
| 2015/0357877 A1 | 12/2015 | Bessho et al. |

FOREIGN PATENT DOCUMENTS

| | | |
|---|---|---|
| JP | 5-245941 A | 9/1993 |
| JP | 10-230378 A | 9/1998 |
| JP | 2003-260739 A | 9/2003 |
| JP | 2007-228667 A | 9/2007 |
| JP | 2011-218583 A | 11/2011 |
| JP | 2013-59770 A | 4/2013 |
| JP | 5246626 B2 | 7/2013 |
| WO | WO2010/072009 A1 | 7/2010 |
| WO | WO2015/1177253 A1 | 8/2015 |

OTHER PUBLICATIONS

Written Opinion (PCT/ISA/237) dated Jan. 19, 2016, by the Japanese Patent Office as the International Searching Authority for International Application No. PCT/ JP2015/079858.
Office Action (Notification of Reasons for Refusal) dated Aug. 29, 2017, by the Japanese Patent Office in Japanese Patent Application No. 2016-556531, and an English Translation of the Office Action. (5 pages).
Office Action (Notification of Reasons for Refusal) dated Oct. 17, 2017, by the Japanese Patent Office in corresponding Japanese Patent Application No. 2016-556531 and English translation of the Office Action. (6 pages).
Office Action dated May 17, 2018, by the Chinese Patent Office in corresponding Chinese Patent Application No. 201580049537.X and English translation of the Office Action. (10 pages).
Office Action dated Aug. 19, 2019, by the German Patent Office in corresponding German Patent Application No. 112015004858.8 and English translation of the Office Action. (11 pages).
Office Action dated Jul. 29, 2021, in corresponding German Patent Application No. 112015004858.8 and English translation of the Office Action. (12 pages).

* cited by examiner

JOINING BODY

CROSS REFERENCE TO RELATED APPLICATION

The present application is a divisional patent application of U.S. application Ser. No. 15/501,728, filed Feb. 3, 2017, which claims benefit of PCT/JP2015/079858, filed Oct. 22, 2015, which claim benefit of Japanese Patent Application No. 2014-218005, filed Oct. 27, 2014, of which the entire contents of each is hereby incorporated herein by reference.

TECHNICAL FIELD

The present invention relates to a joining method, a joining body, a stator for rotating electric machine, and a method for manufacturing the stator for rotating electric machine that, when resin components are joined with each other, even if there is variation in the height direction of the joining position, enable the joining to be performed in a simple manner and necessary strength to be ensured.

BACKGROUND ART

As conventional joining method and joining body, Patent Document 1 disclose the following. A joining component is formed by a first divisional body and a second divisional body being joined with each other, the first divisional body is provided with an attachment portion, and the second divisional body is provided with a fitting portion which can be fitted to the attachment portion. A welding portion which is melted by application of a high-frequency wave or an ultrasonic wave is provided between the attachment portion and the fitting portion. With the attachment portion and the fitting portion fitted to each other, the attachment portion and the fitting portion are welded via the welding portion, whereby the first divisional body and the second divisional body are joined with each other.

As other conventional joining method and joining body, Patent Document 2 discloses an ultrasonic joining method in which ultrasonic vibration is applied to joining portions provided on the surfaces of first and second works that face each other while the joining portions are in contact with each other, thereby welding these works. At least one of the joining portions of the first and second works has a receiving groove, and the first work joining portion is formed between first and second ribs. By an ultrasonic joining device, ultrasonic vibration is applied with the first rib and the joining portion of the second work in contact with each other, whereby a melted member melted from the first rib fills the space between the first rib and the second rib. After the end of the second rib comes into contact with the joining portion of the second work, at any point of time before the facing surfaces of the first and second works except the receiving groove come into contact with each other, the application of ultrasonic vibration is finished. The receiving groove stores at least the melted member melted from the first rib.

As still other conventional joining method and joining body, Patent Document 3 discloses the following. In order to fix a joining element to a substantially cylindrical or slightly conical wall, of an opening of an object, which extends away from the opening, the joining element has a substantially cylindrical or slightly conical wall fixation portion having a shape and a size adapted to the wall. The peripheral surface of the wall fixation portion includes a thermoplastic material, and is provided with an energy director, i.e., a rib and/or a protrusion tapered outward to become a somewhat sharp edge or tip. For the purpose of fixation, in this wall fixation region which has a cross section slightly larger than that of the wall of the opening, mechanical vibration is applied to the near-side end of the joining element, and at the same time, the thermoplastic material of the peripheral surface of the wall fixation portion of the joining element is at least partially liquefied to be thrusted into a hole or recess/protrusion part of the wall or into a cavity specially provided therein, and the joining element is fixed there when the thermoplastic material is solidified again.

CITATION LIST

Patent Document

Patent Document 1: Japanese Laid-Open Patent Publication No. 2003-260739
Patent Document 2: Japanese Laid-Open Patent Publication No. 2011-218583
Patent Document 3: Japanese Patent No. 5246626

SUMMARY OF THE INVENTION

Problems to be Solved by the Invention

For example, in the case where the stator for rotating electric machine is composed of divided cores and a resin component is attached to each divided core, in joining at the part where another resin component is attached to the above resin component, the divided cores have variations in the height direction due to working and assembling, so that the surface to which the resin is to be attached does not have such a height as to form a flat surface. Therefore, in the conventional joining methods and joining bodies described above, when welding is performed at several locations on the surface having height variation, it is necessary to perform welding at the several locations at the same time. Therefore, very great energy is needed, and the device capacity becomes excessively greater than in the case of performing welding on a one-location basis, resulting in a problem that the facility cost increases and the facility area is enlarged.

In addition, in the case where there is height variation, the welding portions include the one having an excessive contact condition and the one having an insufficient contact condition and thus the welding conditions become unstable, resulting in a problem that some of the welding portions do not satisfy necessary strengths.

In the case of using a method in which welding at several locations is not performed at the same time, the resin component is pressed every time welding is performed at one location. Therefore, excessive stress is applied to the welding portion that has not welded yet, and as a result, welding is performed with the resin component deformed, thus causing a problem that residual stress occurs and the resin component is broken.

In the conventional joining methods and joining bodies described above, the resin components and the joining elements have complicated shapes, and the shapes of the resin components and the joining elements need to be highly accurate. Thus, there is a problem that working and molding are difficult and the working cost increases.

In addition, even in the case of not performing welding at several locations at the same time, since individual resin components each include shape error depending on the working accuracy, there is a problem that, even if welding is performed under the same condition, the condition is unstable.

The present invention has been made to solve the above problems, and an object of the present invention is to provide a joining method, a joining body, a stator for rotating electric machine, and a method for manufacturing the stator for rotating electric machine that, even if there is variation in the height direction of the joining position, enable the joining to be performed in a simple manner and necessary strength to be ensured.

Solution to the Problems

A joining method according to the present invention is a joining method for joining a first resin component and a second resin component which are formed of thermoplastic resin materials, the joining method including: an opening placement step of placing a first opening formed in the first resin component and a second opening formed in the second resin component, in a communication direction, or forming a first opening and a second opening so as to communicate with each other, in the first resin component and the second resin component; an insertion step of inserting a joining component astride in the first opening and the second opening, the joining component being formed of a metal material having a higher melting point than those of the thermoplastic resin materials, the joining component having a higher stiffness than those of the first resin component and the second resin component; and a welding step of applying vibration to the joining component, thereby causing the joining component to form welded parts at locations where the first resin component and the second resin component have contact with the joining component.

A joining body according to the present invention is a joining body including: a first resin component formed of a thermoplastic resin material and having a first opening; a second resin component formed of a thermoplastic resin material and having a second opening; and a joining component inserted astride in the first opening of the first resin component and the second opening of the second resin component, the joining component being formed of a metal material having a higher melting point than those of the thermoplastic resin materials, the joining component having a higher stiffness than those of the first resin component and the second resin component, wherein a welded part is formed by welding in at least a part of an area where each of the first resin component and the second resin component has contact with the joining component.

A method for manufacturing a stator for rotating electric machine according to the present invention is a method for manufacturing a stator for rotating electric machine, the stator including: a stator core formed in an annular shape; an insulation holder covering the stator core; a coil wound around the insulation holder; and a wire connection ring provided at an end portion of the coil and holding a conductive portion, the method being for joining the insulation holder and the wire connection ring which are formed of thermoplastic resin materials, the method including: an opening placement step of placing a first opening formed in the insulation holder and a second opening formed in the wire connection ring, in a communication direction, or forming a first opening and a second opening so as to communicate with each other, in the insulation holder and the wire connection ring; an insertion step of inserting a joining component astride in the first opening and the second opening, the joining component being formed of a metal material having a higher melting point than those of the thermoplastic resin materials, the joining component having a higher stiffness than those of the insulation holder and the wire connection ring; and a welding step of applying vibration to the joining component, thereby causing the joining component to form welded parts at locations where the insulation holder and the wire connection ring have contact with the joining component.

A stator for rotating electric machine according to the present invention is a stator for rotating electric machine, the stator including: a stator core formed in an annular shape; an insulation holder covering the stator core; a coil wound around the insulation holder; and a wire connection ring provided at an end portion of the coil and holding a conductive portion. The insulation holder is formed of a thermoplastic resin material and has a first opening, and the wire connection ring is formed of a thermoplastic resin material and has a second opening. The stator further includes a joining component inserted astride in the first opening of the insulation holder and the second opening of the wire connection ring, the joining component being formed of a metal material having a higher melting point than those of the thermoplastic resin materials, the joining component having a higher stiffness than those of the insulation holder and the wire connection ring. A welded part is formed by welding in at least a part of an area where each of the insulation holder and the wire connection ring has contact with the joining component.

Effect of the Invention

The joining method, the joining body, the stator for rotating electric machine, and the method for manufacturing the stator for rotating electric machine according to the present invention enable the joining to be performed in a simple manner and necessary strength to be ensured, even if there is variation in the height direction of the joining position.

DESCRIPTION OF EMBODIMENTS

Embodiment 1

Hereinafter, embodiments of the invention of the present application will be described. First, the invention of the present application is directed to a joining method for joining a first resin component and a second resin component, and a joining body joined by the joining method. In the present embodiment, as the joining body, a stator for a rotating electric machine mounted on a vehicle machine or an industrial machine will be described, for example. In addition, as the first resin component and the second resin component, parts composing the rotating electric machine, e.g., an insulation holder and a wire connection ring will be described, for example.

The invention of the present application is not limited to an example shown in the present embodiment, but is applicable in the same manner to any configuration in which the first resin component, the second resin component, and the joining component can be adopted, whereby the same effect can be provided. Hereinafter, the description in this regard will be omitted as appropriate.

Figure 1:
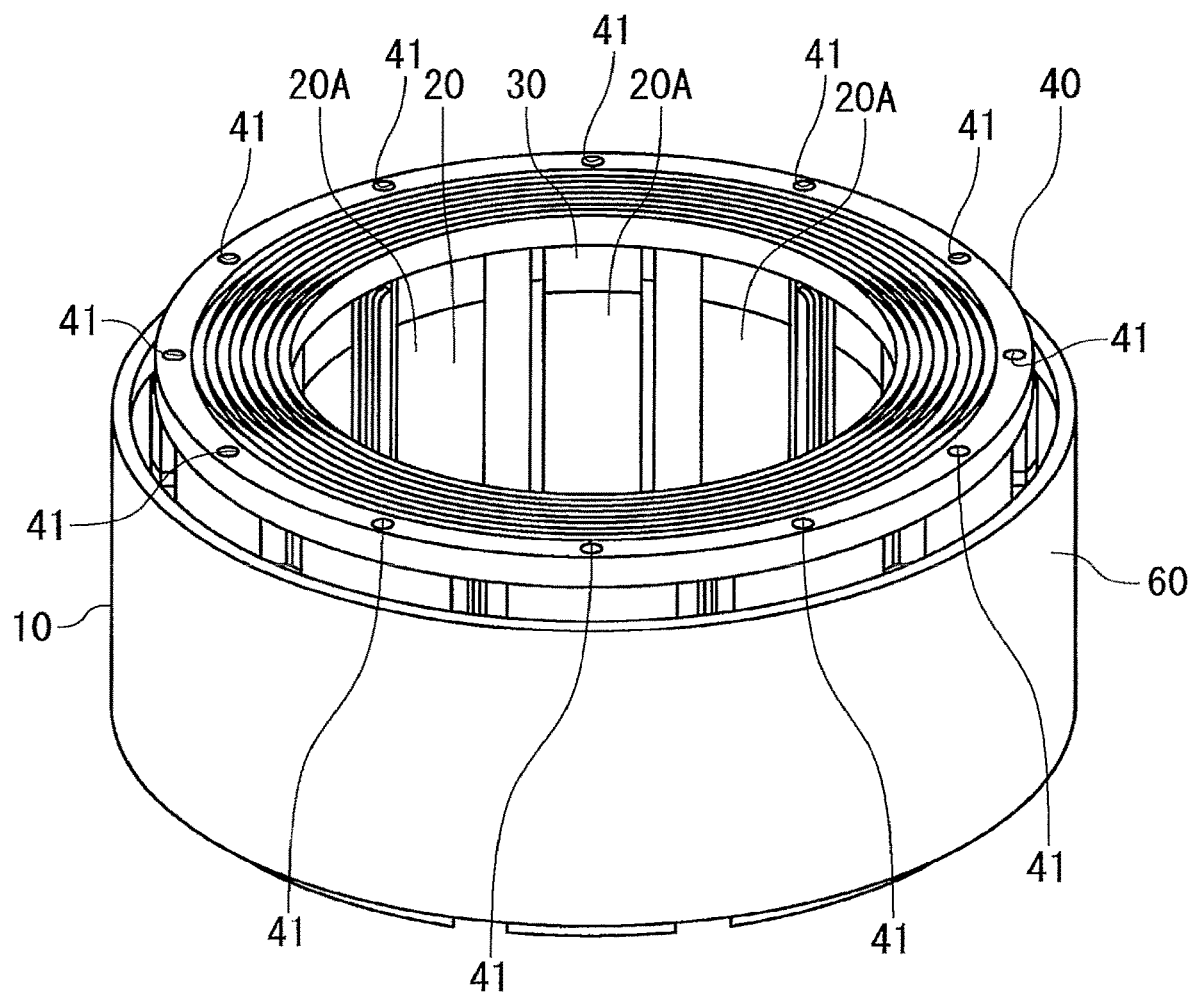
FIG. 1 is a diagram showing the configuration of a stator for rotating electric machine according to embodiment 1 of the present invention.
Figure 2:
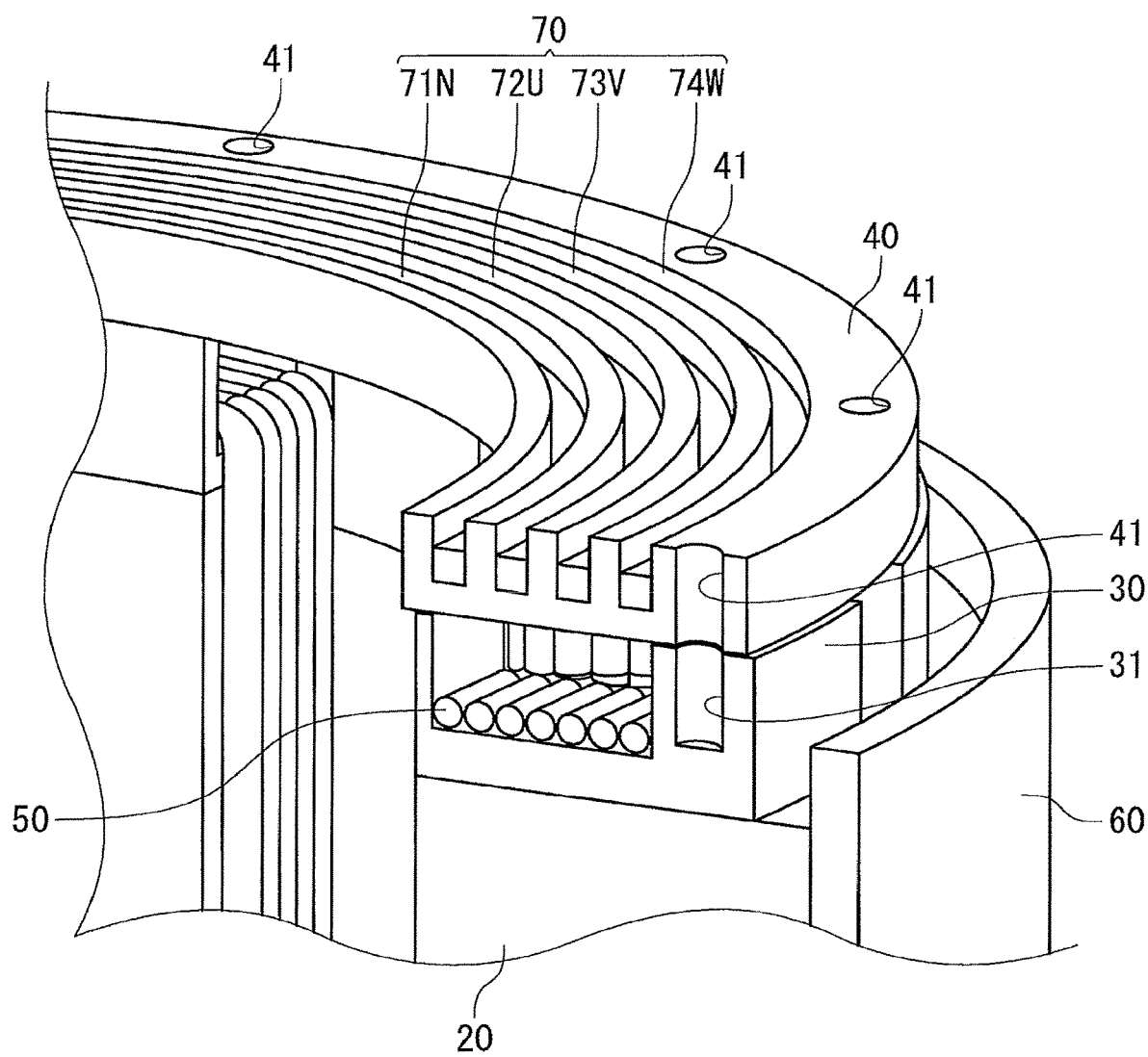
FIG. 2 is a partial perspective view of the stator shown in FIG. 1 before a joining component is inserted.

FIG. 1 is a perspective view showing the configuration of the stator for rotating electric machine. FIG. 2 is a partial perspective view showing the stator for rotating electric machine shown in FIG. 1 before a joining component is inserted into a first opening and a second opening. FIG. 3 is partial sectional views showing the stator shown in FIG. 1 before the joining component is inserted into the first opening and the second opening and after the joining component is inserted to be joined. FIG. 4 is a process diagram showing the joining method according to embodiment 1 of the present invention. FIG. 5 is sectional views showing the joining body joined by the joining method according to embodiment 1 of the present invention.

In the drawings, the stator 10 for rotating electric machine includes a stator core 20, an insulation holder 30, a wire connection ring 40, a coil 50, a housing 60, and a conductive portion 70. Therefore, in the present embodiment 1, the stator 10 corresponds to the joining body, the insulation holder 30 corresponds to the first resin component, and the wire connection ring 40 corresponds to the second resin component. The insulation holder 30 and the wire connection ring 40 are formed of thermoplastic resin materials.

In the rotating electric machine of the present embodiment 1, the stator core 20 is formed by a plurality of divided cores 20A being arranged in an annular shape, as an example. Therefore, in order to arrange and connect these divided cores 20A in a circular shape to form the stator core 20, the outer circumferential side of the stator core 20 is placed within the housing 60. Here, the case where the number of the divided cores 20A of the stator core 20 is twelve is shown.

The conductive portions 70 for U phase, V phase, W phase, and the neutral point are mounted on the wire connection ring 40. In the present embodiment 1, an example in which the stator core 20 is formed of the divided cores 20A is shown, but without limitation thereto, an integrated-type stator core is also applicable in the same manner. In the case of forming the stator core 20 by the divided cores 20A, the insulation holder 30 may be divided for each divided core 20A.

The stator core 20 is formed by stacking electromagnetic steel sheets. The stator core 20 is provided with the insulation holder 30 surrounding the peripheral side surface thereof. The coil 50 is formed by winding, in plural layers, an electric wire around the insulation holder 30 mounted on the stator core 20. The wire connection ring 40 is provided at the coil end which is the end portion of the coil 50. The wire connection ring 40 is for making electric connection of the coil 50 wound on the stator core 20. The wire connection ring 40 is formed so as to be able to insulate a neutral-point conductive portion 71N, a U-phase conductive portion 72U, a V-phase conductive portion 73V, and a W-phase conductive portion 74W which have ring shapes, and to support them in a fixed manner. The coil 50 is connected with each conductive portion 72U, 73V, 74W by welding.

The insulation holder 30 and the wire connection ring 40 have first openings 31 and second openings 41, respectively. The first opening 31 and the second opening 41 are formed so as to allow a joining component 80 for joining them with each other to be inserted therein. Here, an example in which the second opening 41 is formed at the position corresponding to each divided core 20A and the first opening 31 is formed so as to correspond to the second opening 41, is shown. The first opening 31 and the second opening 41 are provided so as to communicate with each other. The height direction of the joining position refers to the communication direction between the first opening 31 and the second opening 41. The joining component 80 is inserted astride in the first opening 31 and the second opening 41.

Figure 3A:
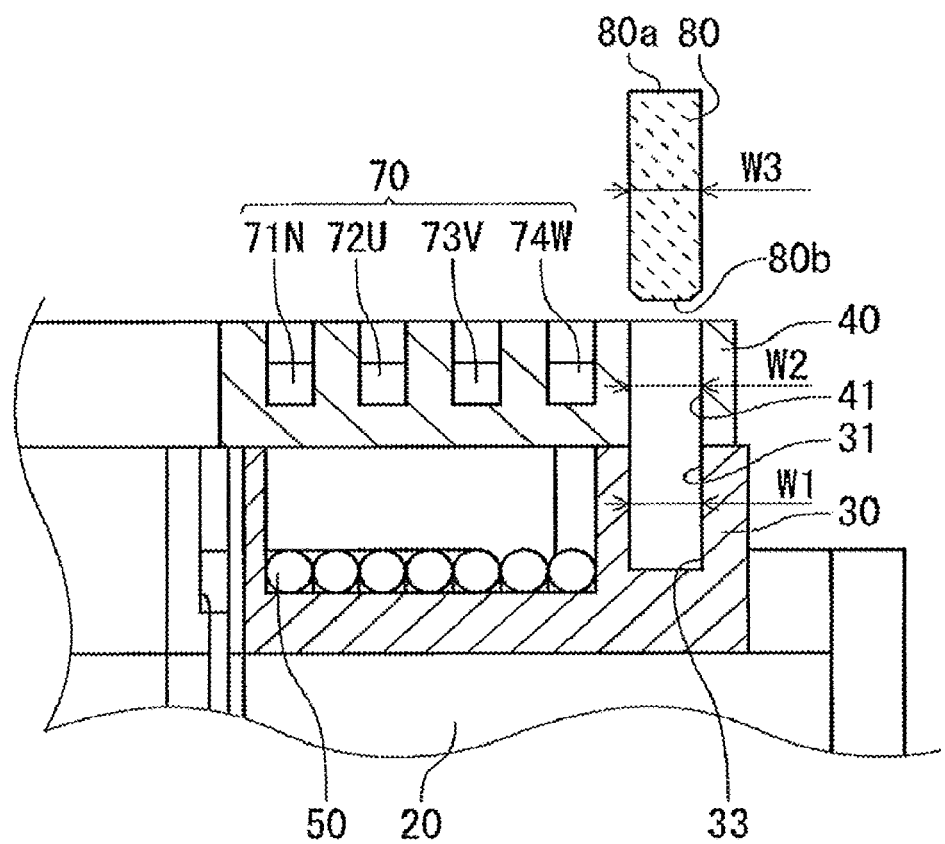
FIGS. 3(a) and 3(b) are partial sectional views showing the configuration of the stator shown in FIG. 1.
Figure 3B:
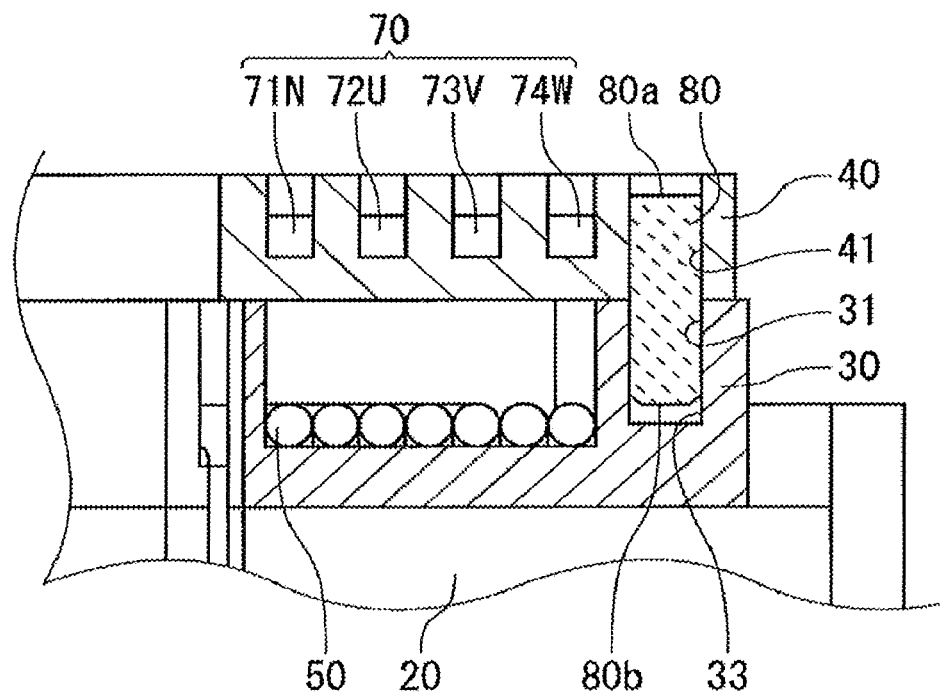
Figure 4A:
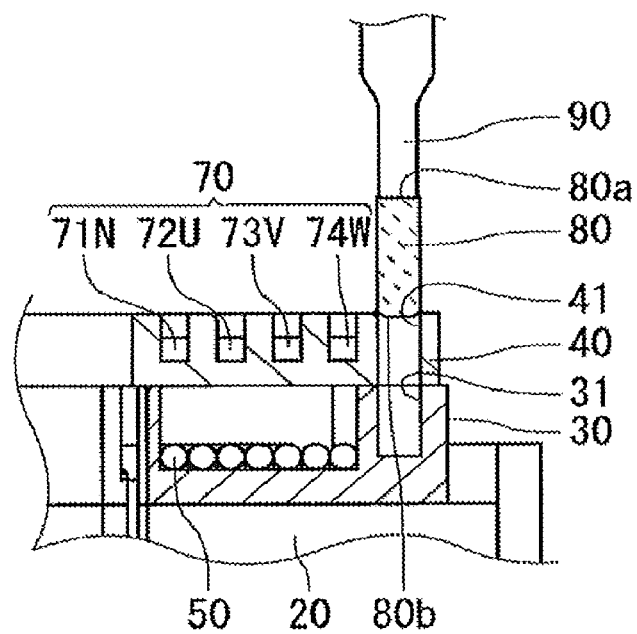
FIGS. 4(a), 4(b) and 4(c) are a process diagram showing a joining method according to embodiment 1 of the present invention.

As shown in FIG. 3(a), before the joining component 80 is inserted, the opening sizes W1 and W2 of the first opening 31 and the second opening 41 are slightly smaller than a size W3 of the largest outer-shape part, of the joining component 80, that is to be inserted into the first opening 31 and the second opening 41. To describe a specific example, before the joining component 80 is inserted, the opening sizes W1 and W2 of the first opening 31 and the second opening 41 are about 2 mm to 4 mm. It is conceivable that the size W3 of the largest outer-shape part of the joining component 80 is greater than the opening sizes W1 and W2 of the first opening 31 and the second opening 41 by 0.1 mm or more but less than 1 mm.

The outer shape of the joining component 80 is a substantially columnar shape or a substantially rectangular parallelepiped shape. The joining component 80 is formed of a metal material having a higher melting point than those of the thermoplastic resin materials forming the insulation holder 30 and the wire connection ring 40. In addition, the joining component 80 has a higher stiffness than those of the insulation holder 30 and the wire connection ring 40. Here, the stiffness refers to a bending stiffness. A material that is less bent when the material is pressed at a given load is defined to have a high stiffness, and a material that is greatly bent is defined to have a low stiffness. Examples of metal materials for forming the joining component 80 include copper, brass, iron, aluminum, silver, gold, platinum, and alloys thereof.

The joining component 80 is formed with a front end portion 80b thereof chamfered in order to facilitate insertion into the first opening 31 and the second opening 41. In addition, a rear end portion 80a of the joining component 80 is formed to have such a surface that allows a resonator 90 described later to be easily placed thereon. In addition, a pocket portion 33 into which the joining component 80 is not inserted is set at the lower end side of the second opening 41. As for the front end portion 80b and the rear end portion 80a of the joining component 80, the side to be initially inserted into the second opening 41 is referred to as the front end portion 80b, and the opposite side is referred to as the rear end portion 80a. As a result of the insertion, the rear end portion 80a of the joining component 80 is located in the second opening 41, and the front end portion 80b is located in the first opening 31.

Next, the joining method for the joining body of embodiment 1 configured as described above will be described. First, the insulation holder 30 and the wire connection ring 40 are positioned such that the first opening 31 and the second opening 41 communicate with each other (opening placement step). As the positioning method, the insulation holder 30 and the wire connection ring 40 may be positioned with each other, or the positioning may be performed by using a fixture for placing the insulation holder 30 and the wire connection ring 40. Next, as shown in FIG. 4(a), the front end portion 80b of the joining component 80 is set on the second opening 41 of the wire connection ring 40.

Figure 4B:
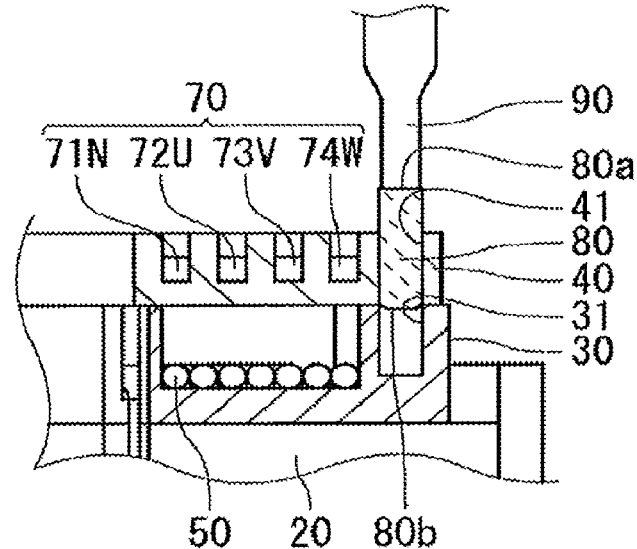
Figure 5A:
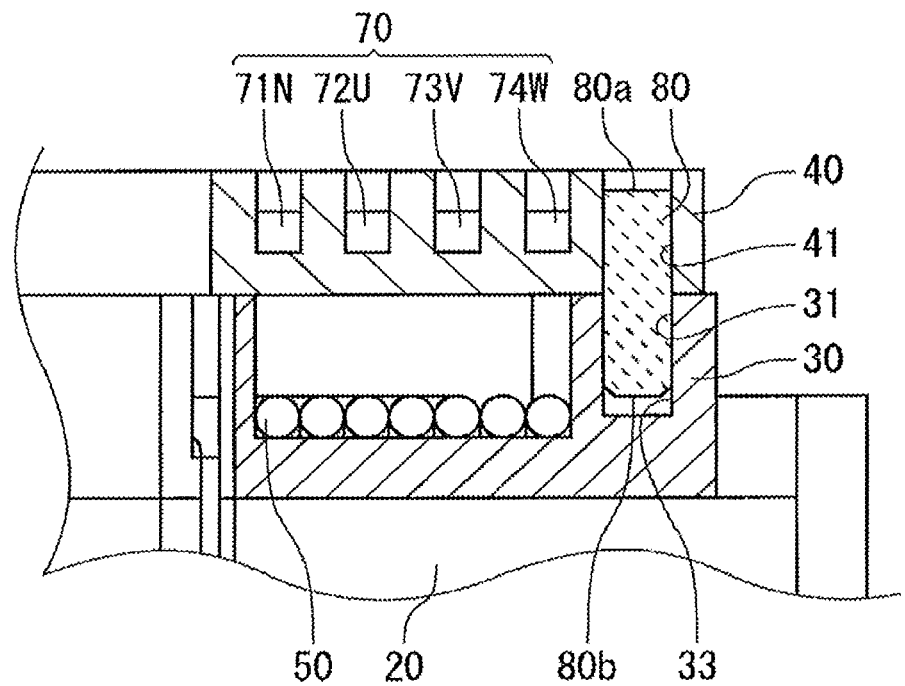
FIGS. 5(a) and 5(b) are sectional views showing a joining body joined by the joining method according to embodiment 1 of the present invention.
Figure 5B:
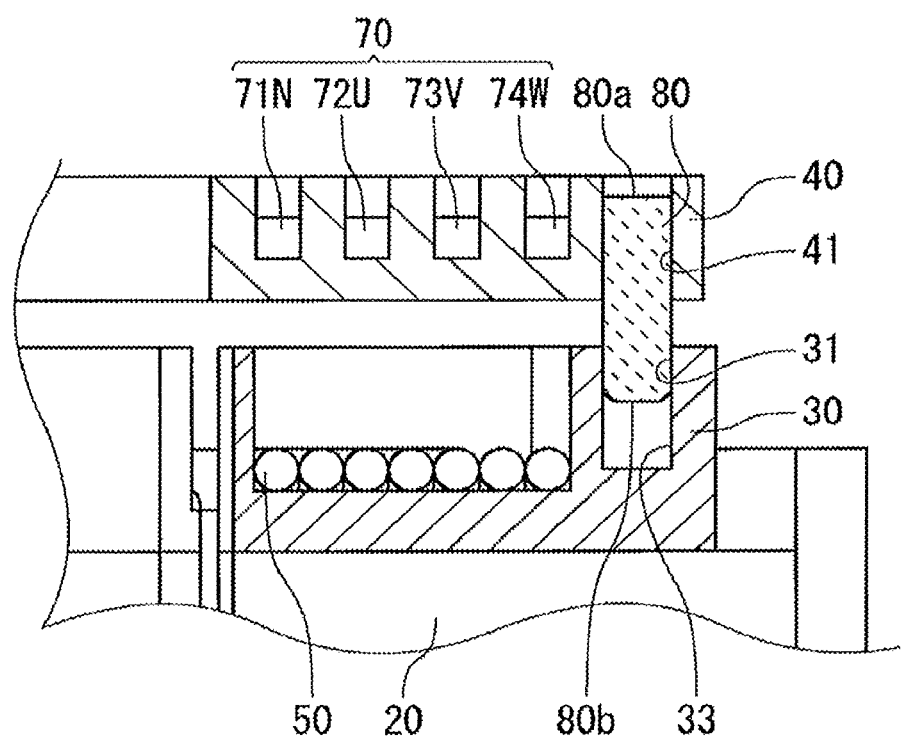

Next, as shown in FIG. 4(b), the resonator 90 connected to an ultrasonic wave generator or a high-frequency wave generator is pushed to the rear end portion 80a of the joining component 80, and an ultrasonic wave or a high-frequency wave is generated. Thus, vibration due to the ultrasonic wave or the high-frequency wave is applied to the joining component 80. Then, the vibration due to the ultrasonic wave or the high-frequency wave is applied to the wire connection ring 40 via the joining component 80. Then, friction occurs between the joining component 80 and the wire connection ring 40. Due to this friction, frictional heat is generated between the joining component 80 and the wire connection ring 40. Then, the inner side, of the second opening 41 of the wire connection ring 40, which has contact with the joining component 80 is melted.

Figure 4C:
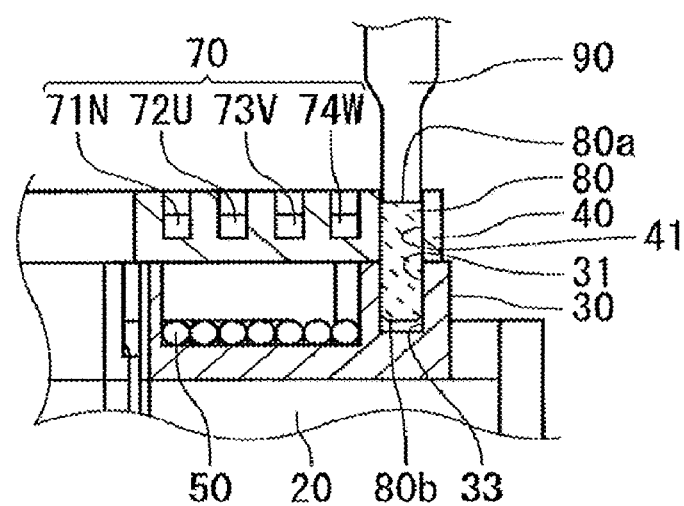

Therefore, although the size W3 of the joining component 80 is slightly greater than the size W2 of the second opening 41, the joining component 80 is inserted downward in the second opening 41. Subsequently, the ultrasonic wave or the high-frequency is further applied, whereby, in the same manner as described above, friction occurs between the joining component 80 and the insulation holder 30 as shown in FIG. 4(c). Due to this friction, frictional heat is generated between the joining component 80 and the insulation holder 30. Then, the inner side, of the first opening 31 of the insulation holder 30, which has contact with the joining component 80 is melted. Therefore, although the size W3 of the joining component 80 is slightly greater than the size W1 of the first opening 31, the joining component 80 is inserted into the first opening 31 (insertion step and welding step).

Thus, the joining component 80 is inserted astride in the first opening 31 and the second opening 41. As a result of the insertion, the rear end portion 80a of the joining component 80 is located in the second opening 41, and the front end portion 80b is located in the first opening 31. Therefore, the rear end portion 80a and the front end portion 80b of the joining component 80 are not located out of the first opening 31 and the second opening 41, respectively.

As described above, the size W3 of the joining component 80 is slightly greater than the opening sizes W1 and W2 of the first opening 31 and the second opening 41. Therefore, the joining component 80 does not move into the first opening 31 and the second opening 41 unless a downward force is applied to the joining component 80. Therefore, if the application of the downward force to the joining component 80 is stopped, the joining component 80 can remain at the present position.

Next, the generation of the ultrasonic wave or the high-frequency by the resonator 90 is stopped. Then, when a predetermined time has elapsed, the melted thermoplastic resin material is solidified to form welded parts. As a result, the wire connection ring 40 and the insulation holder 30 are joined with the joining component 80, and welded parts are formed respectively at the insulation holder 30 and the wire connection ring 40 via the joining component 80, to make joining.

In embodiment 1, the welded parts are not shown in the drawings. The reason is as follows. At the welded parts in embodiment 1, the surface of the joining component 80 has a surface roughness of several μm, which is used as a minute recess/protrusion portion, and the thermoplastic resin material is melted into the minute recess/protrusion portion, whereby the same welded part X as in the embodiments described later is formed. Therefore, it is difficult to show the welded parts in the drawings.

As described above, the joining component 80 formed of a metal material is strongly joined with the insulation holder 30 and the wire connection ring 40. Therefore, in the stator 10, joining between the insulation holder 30 and the wire connection ring 40 need not be made in all of the second openings 41 and the first openings 31 formed in the respective divided cores 20A, but joining between the insulation holder 30 and the wire connection ring 40 only has to be made in a necessary number of second openings 41 and first openings 31 for the joining. The joining between the second openings 41 and the first openings 31 at a plurality of locations may be performed for each location individually or may be performed for the plurality of locations at the same time.

Conventionally, in order to join the wire connection ring 40 and the insulation holder 30, it is essential that the wire connection ring 40 and the insulation holder 30 have contact with each other. To achieve this, the flat surface of the wire connection ring 40 formed by cutting and molding, and the flat surface of the insulation holder 30 formed by cutting and molding, need to have high accuracy, leading to high manufacturing cost. Further, even if they are manufactured with such high accuracy, contact between the wire connection ring 40 and the insulation holder 30 becomes unstable due to variation in the height direction upon assembly of the insulation holder 30 of the stator 10, and variation in the height direction upon assembly of the stator cores 20. Therefore, in the conventional case, the fixation is unstable unless the wire connection ring 40 and the insulation holder 30 have contact with each other.

In the present embodiment, for example, as shown in FIG. 5(*a*), in the case where the insulation holder 30 and the wire connection ring 40 have contact with each other, as described above, the insulation holder 30 and the wire connection ring 40 are joined with each other via the joining component 80 and thus sufficient joining is achieved. Further, as shown in FIG. 5(*b*), even in the case where the insulation holder 30 and the wire connection ring 40 do not have contact with each other, since the insulation holder 30 is joined with the joining component 80 and the wire connection ring 40 is joined with the joining component 80, and the joining component 80 is formed of a metal material, the wire connection ring 40 and the insulation holder 30 can be fixed via the joining component 80.

As a result, the working for the insulation holder 30 and the wire connection ring 40 is facilitated, and the manufacturing cost for the rotating electric machine can be reduced. In addition, since variation in the height direction upon assembly of the stator 10 and the insulation holder 30 and variation in the height direction upon assembly of the stator cores 20 can be absorbed, the assembly is facilitated and the facility cost can be reduced.

In addition, in the case where there is variation in the height direction of the joining position on the surface of the insulation holder 30 to which the wire connection ring 40 is fixed, there are parts where the wire connection ring 40 is fixed without contact with the insulation holder 30, and parts where the wire connection ring 40 is fixed in contact with the insulation holder 30. Therefore, in order to obtain sufficient fixation, a fixation force in a contactless state is needed. Therefore, in the contact state, the joining component 80 is to melt more of the thermoplastic resin material of the insulation holder 30, as compared to the contactless state. Thus, the thermoplastic resin material that has been more melted leaks between the insulation holder 30 and the wire connection ring 40 if no relief is provided. Therefore, in the present embodiment 1, the pocket portion 33 in which the joining component 80 is not inserted is provided for accumulating the resin in the insulation holder 30, thereby preventing leakage of the thermoplastic resin material.

In the joining method, the joining body, the stator for rotating electric machine, and the method for manufacturing the stator for rotating electric machine according to embodiment 1 configured as described above, the joining component formed of a metal material is inserted into the first opening and the second opening formed in the first resin component and the second resin component, and then joined by welding. Therefore, even if the first resin component and the second resin component are separated from each other, it is possible to make strong fixation and joining because the joining component is formed of a metal material. Therefore, it is possible to make joining for the rotating electric machine, with a simple structure and with a necessary strength, whereby the manufacturing cost for the rotating electric machine can be reduced. Here, the case where the first resin component and the second resin component are separated from each other includes the case where there is variation in the height direction of the joining position.

Further, even in the case where such joining by the joining component is performed at multiple points in one joining body, the joining at the multiple points need not be performed at the same time and energy can be saved, and thus the facility cost can be reduced. In addition, even if the work shape of the joining portion has low accuracy, variation in the height direction can be absorbed and thus the strength is stabilized.

Further, the front end portion and the rear end portion of the joining component are located in the first opening and the second opening, respectively. Thus, since the joining component is not exposed out of the first opening and the second opening, the rotating electric machine can be downsized as compared to the case of making fixation by a bolt or welding.

In the above embodiment 1, an example in which the first opening and the second opening are formed in advance in the first resin component and the second resin component, respectively, has been shown. However, without limitation thereto, after the first resin component and the second resin component are placed, the first opening and the second opening may be formed so as to communicate with each other. The same applies also in the following embodiments, and therefore such a description will be omitted as appropriate.

In the above embodiment 1, the size of the largest outer-shape part, of the joining component, that is to be inserted into the first opening and the second opening is greater than the opening sizes of the first opening and the second opening, and therefore an example in which the insertion step and the welding step are performed at the same time has been shown. However, without limitation thereto, in the case where the size of the largest outer-shape part, of the joining component, that is to be inserted into the first opening and the second opening is equal to or slightly smaller than the opening sizes of the first opening and the second opening, the welding step of vibrating the joining component to perform welding may be performed after the insertion step of inserting the joining component into the first opening and the second opening.

Embodiment 2

Figure 6:
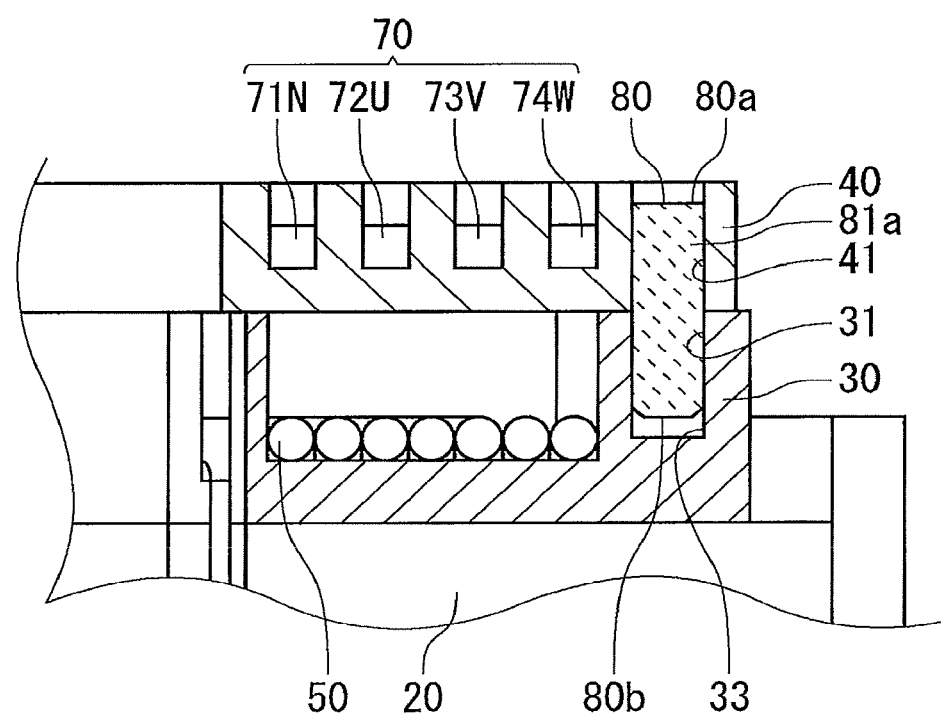
FIG. 6 is a sectional view showing the configuration of a stator (joining body) according to embodiment 2 of the present invention.
Figure 7A:
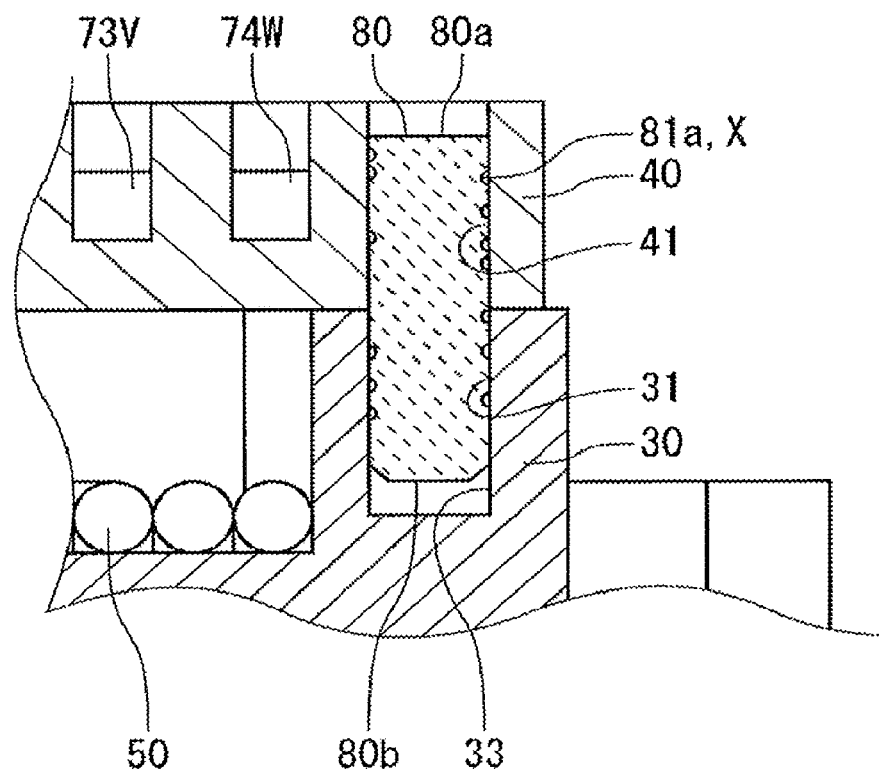
FIGS. 7(a) and 7(b) are enlarged sectional views showing the configuration of the stator shown in FIG. 6.
Figure 7B:
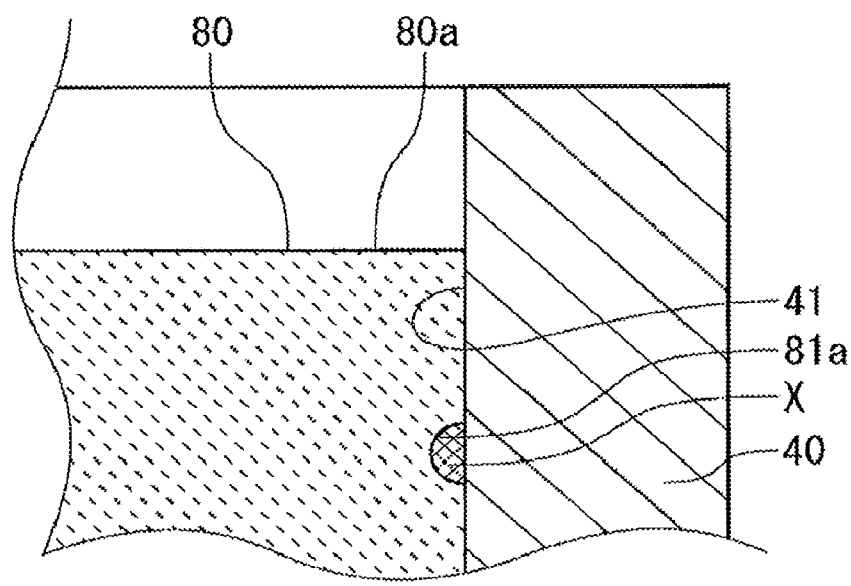

FIG. 6 is a sectional view showing the configuration of a stator (joining body) according to embodiment 2 of the present invention. FIG. 7 is enlarged sectional views showing the configuration of the stator shown in FIG. 6. In the drawings, the components that are the same as those in the above embodiment 1 are denoted by the same reference characters, and the description thereof is omitted. A plurality of recess/protrusion portions 81*a* are formed on the surface of the joining component 80. Each recess/protrusion portion 81*a* of the joining component 80 can be formed by cutting or forging. Alternatively, each recess/protrusion portion 81*a* can be formed by shot blasting or etching.

The same joining method as in the above embodiment 1 is applied to the joining component 80 having the recess/protrusion portions 81*a* in embodiment 2 configured as described above. That is, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted at the protrusion side of the recess/protrusion portion 81*a*. Thereafter, as shown in FIG. 7, the melted thermoplastic resin materials of the wire connection ring 40 and the insulation holder 30 flow into the recess side of each recess/protrusion portion 81*a* on the surface. Then, the thermoplastic resin having flowed therein is solidified to be welded. Thus, welded parts X are formed in the recess/protrusion portions 81*a*.

In the joining method, the joining body, the stator for rotating electric machine, and the method for manufacturing the stator for rotating electric machine according to embodiment 2 configured as described above, the same effect as in the above embodiment 1 is naturally provided, and in addition, as compared to the case of providing no recess/protrusion portion in the joining component, it is possible to enhance the fixation force between the joining component and each of the wire connection ring and the insulation holder because the thermoplastic resin material enters into the recess/protrusion portions of the joining component and thus is caught. In addition, since the fixation force can be enhanced, if the same fixation force as in the conventional case is desired to be obtained, it is possible to reduce the number of joining positions at which joining is made by the joining components in the stator as a whole, whereby the number of manufacturing steps can be decreased. It is noted that a welded part X may be formed also at a portion other than the recess/protrusion portions. The same applies also in the following embodiments, and therefore such a description will be omitted as appropriate.

However, in order to ensure that the thermoplastic resin material enters into the recess/protrusion portions of the joining component to form welded parts at the recess/protrusion portions, the size of the largest outer-shape part, of the joining component, that is to be inserted into the first opening and the second opening needs to be greater than the opening sizes of the first opening and the second opening, and the joining method in which the insertion step and the welding step are performed at the same time needs to be employed. The same applies also in the following embodiments, and therefore such a description will be omitted as appropriate.

Embodiment 3

Figure 8:
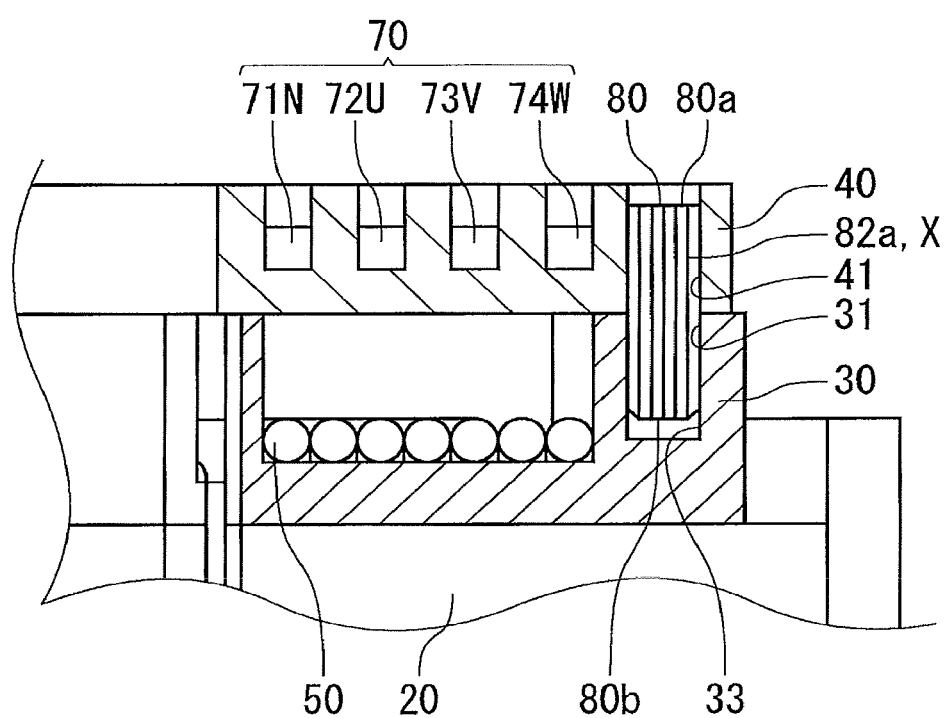
FIG. 8 is a sectional view showing the configuration of a stator (joining body) according to embodiment 3 of the present invention.
Figure 9:
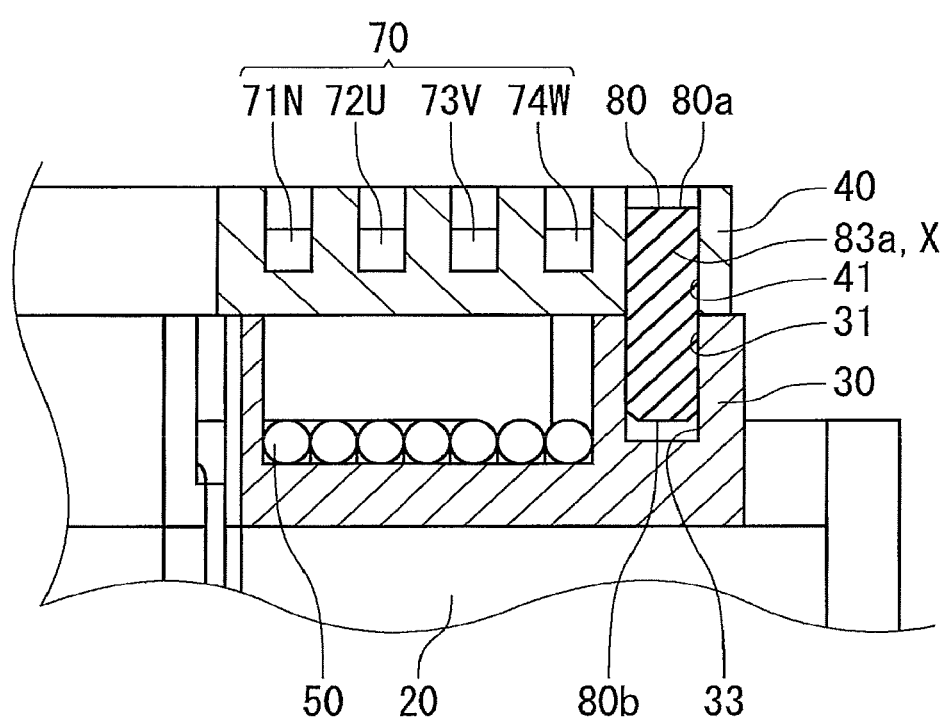
FIG. 9 is a sectional view showing the configuration of another stator (joining body) according to embodiment 3 of the present invention.
Figure 10:
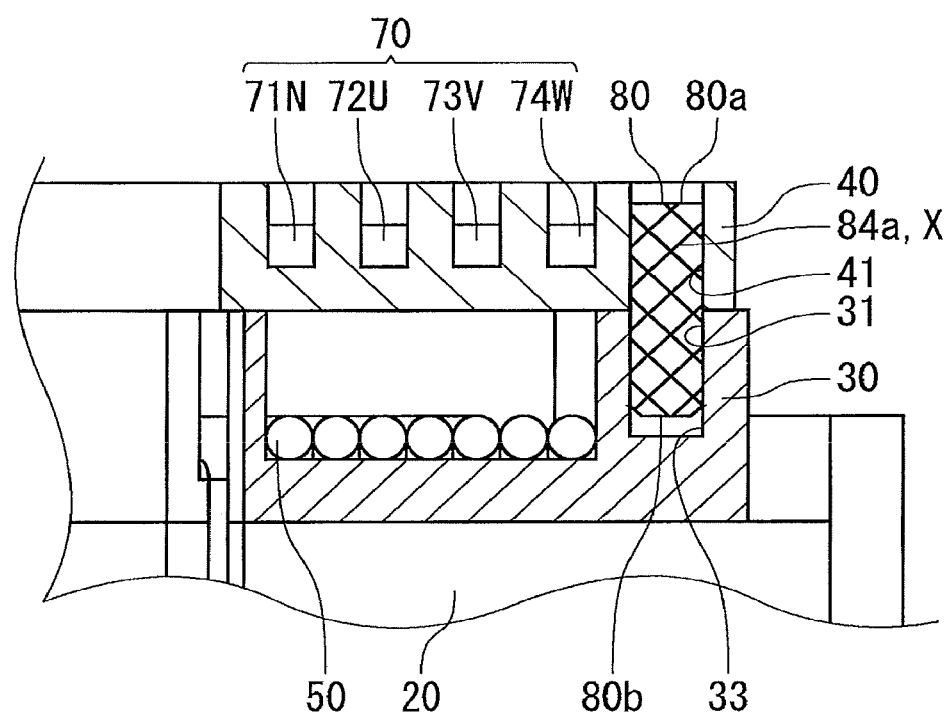
FIG. 10 is a sectional view showing the configuration of still another stator (joining body) according to embodiment 3 of the present invention.

In the present embodiment 3, an example in which the recess/protrusion portions on the surface of the joining component are formed through various types of knurling will be described. FIG. 8 is a sectional view showing the configuration of a stator (joining body) according to embodiment 3 of the present invention. FIG. 9 is a sectional view showing the configuration of another stator (joining body) according to embodiment 3 of the present invention. FIG. 10 is a sectional view showing the configuration of still another stator (joining body) according to embodiment 3 of the present invention.

In the drawings, the components that are the same as those in the above embodiments are denoted by the same reference characters, and the description thereof is omitted. In the present embodiment 3, an example in which recess/protrusion portions are formed on the surface of the joining component 80 through knurling is shown. In FIG. 8, a plurality of recess/protrusion portions 82a are subjected to straight knurling by cutting, rolling, and forging. In FIG. 9, a plurality of recess/protrusion portions 83a are subjected to oblique knurling by cutting, rolling, and forging. In FIG. 10, a plurality of recess/protrusion portions 84a are subjected to diamond knurling by cutting, rolling, and forging.

The same joining method as in the above embodiments is applied to the joining component 80 having the recess/protrusion portions 82a, the recess/protrusion portions 83a, or the recess/protrusion portions 84a in embodiment 3 configured as described above. That is, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted. At this time, as shown in the drawings, the melted thermoplastic resin materials of the wire connection ring 40 and the insulation holder 30 flow into the recess/protrusion portion 82a, the recess/protrusion portion 83a, or the recess/protrusion portion 84a on the surface, and then are solidified to be welded. Then, welded parts X are formed in the recess/protrusion portions 82a, the recess/protrusion portions 83a, or the recess/protrusion portions 84a.

In the joining method, the joining body, the stator for rotating electric machine, and the method for manufacturing the stator for rotating electric machine according to embodiment 3 configured as described above, the same effects as in the above embodiments are naturally provided, and in addition, by making welding at the recess/protrusion portions of the joining component which are subjected to straight knurling, it is possible to enhance the fixation force in the rotation direction of the axis of the joining component, between the joining component and each of the wire connection ring and the insulation holder.

In addition, by making welding at the recess/protrusion portions of the joining component which are subjected to oblique knurling, it is possible to enhance the fixation force in the rotation direction of the axis of the joining component, between the joining component and each of the wire connection ring and the insulation holder.

In addition, by making welding at the recess/protrusion portions of the joining component which are subjected to diamond knurling, it is possible to enhance the fixation force in the axis direction of the joining component and in the rotation direction of the axis, between the joining component and each of the wire connection ring and the insulation holder.

Therefore, it is possible to further enhance the fixation force for the joining body, whereby the durability is improved. Since the fixation force is enhanced, the number of the joining components can be further decreased, whereby the number of manufacturing steps can be further decreased.

Embodiment 4

Figure 11A:
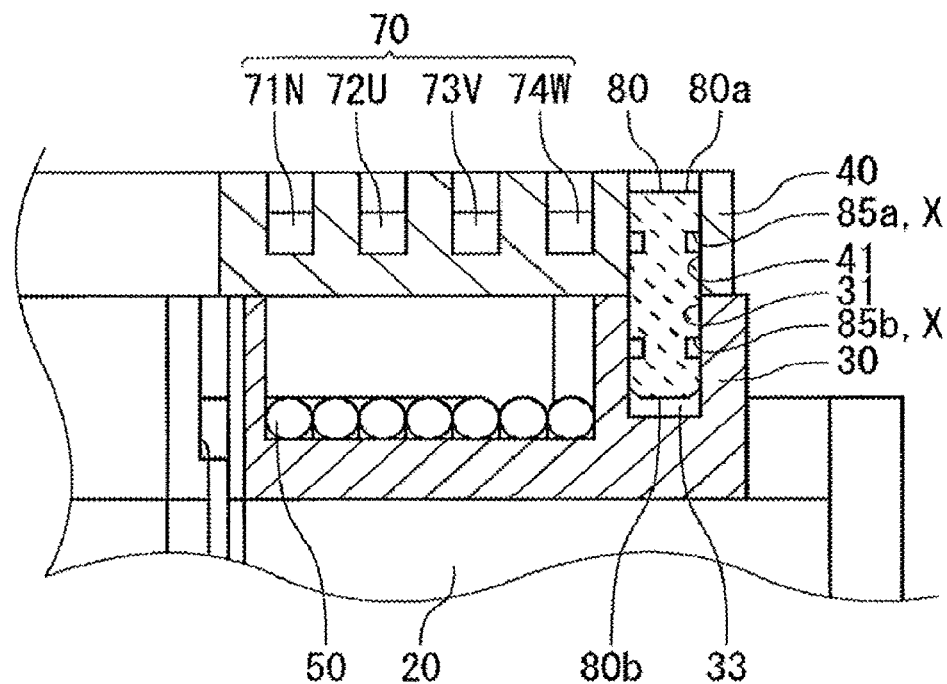
FIGS. 11(a) and 11(b) are sectional views showing the configuration of a stator (joining body) according to embodiment 4 of the present invention.
Figure 11B:
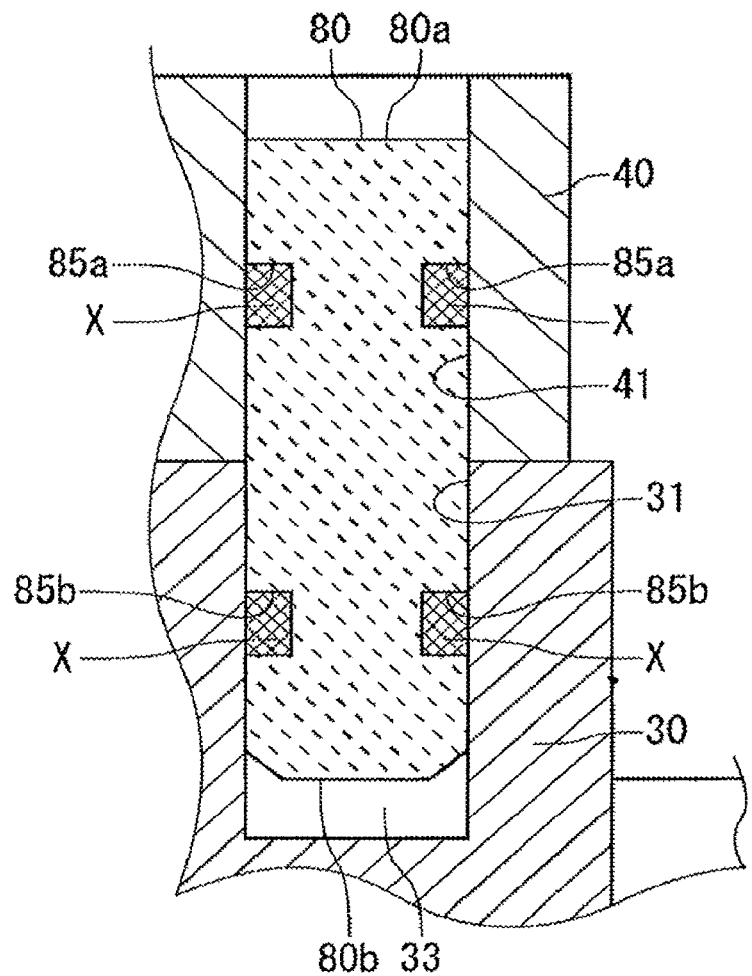
Figure 12:
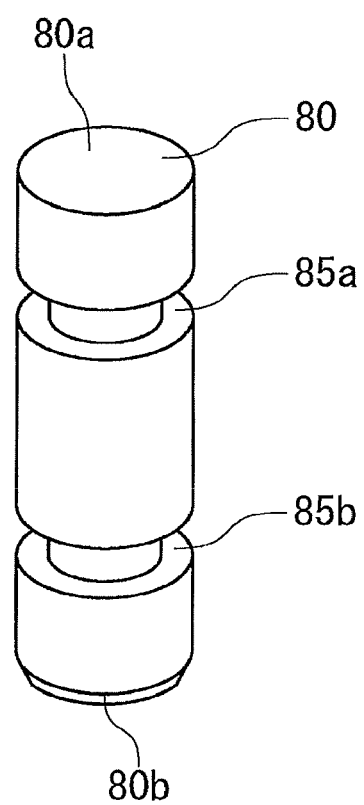
FIG. 12 is a perspective view showing the configuration of a joining component shown in FIGS. 11(a) and 11(b).

FIG. 11 is sectional views showing the configuration of a stator (joining body) according to embodiment 4 of the present invention. FIG. 12 is a perspective view showing the configuration of the joining component shown in FIG. 11. In the drawings, the components that are the same as those in the above embodiments are denoted by the same reference characters, and the description thereof is omitted. In the present embodiment 4, at a location, on the surface of the joining component 80, that corresponds to the inside of the first opening 31 of the insulation holder 30, a recess/protrusion portion 85b is formed in a groove shape so as to extend around the outer circumference of the joining component 80.

Further, at a location, on the surface of the joining component 80, that corresponds to the inside of the second opening 41 of the wire connection ring 40, a recess/protrusion portion 85a is formed in a groove shape so as to extend around the outer circumference of the joining component 80. The grooves of the recess/protrusion portions 85a and 85b may have a rectangular sectional shape as shown in the drawings, or, for example, may be formed in a double-chamfered-hole shape having the width across flats, or in an arc or polygonal shape. The recess/protrusion portion 85a and the recess/protrusion portion 85b can be formed by cutting, forging, and rolling.

The same joining method as in the above embodiments is applied to the joining component 80 having the recess/protrusion portion 85a and the recess/protrusion portion 85b in embodiment 4 configured as described above. That is, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted. At this time, as shown in FIG. 11, the melted thermoplastic resin materials of the wire connection ring 40 and the insulation holder 30 flow into the recess/protrusion portion 85b and the recess/protrusion portion 85a on the surface, and then are solidified to be welded. Then, welded parts X are formed in the recess/protrusion portion 85a and the recess/protrusion portion 85b.

In the joining method, the joining body, the stator for rotating electric machine, and the method for manufacturing the stator for rotating electric machine according to embodiment 4 configured as described above, the same effects as in the above embodiments are naturally provided, and in addition, it is possible to enhance the fixation force between the joining component and each of the wire connection ring and the insulation holder while minimizing the number of the recess/protrusion portions.

Embodiment 5

Figure 13:
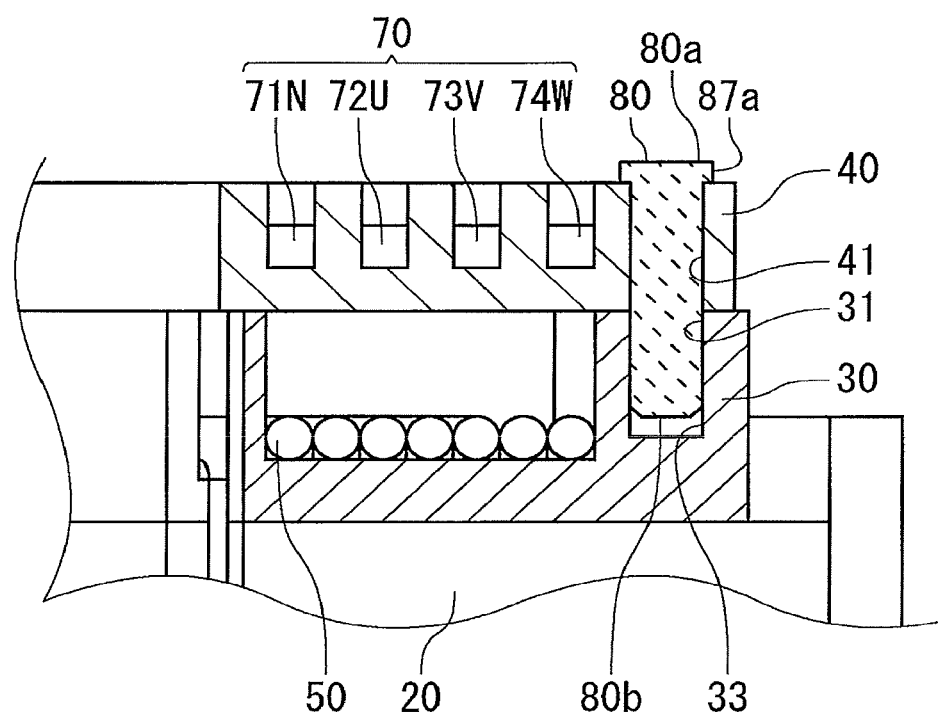
FIG. 13 is a sectional view showing the configuration of a stator (joining body) according to embodiment 5 of the present invention.

FIG. 13 is a sectional view showing the configuration of a stator (joining body) according to embodiment 5 of the present invention. In the drawings, the components that are the same as those in the above embodiments are denoted by the same reference characters, and the description thereof is omitted. The rear end portion 80a of joining component 80 has a flange portion 87a formed to be greater than the opening of the second opening 41.

In the case of applying the same joining method as in the above embodiments to the joining component 80 having the flange portion 87a in embodiment 5 configured as described above, since the flange portion 87a of the joining component 80 is formed to be greater than the opening of the second opening 41, the flange portion 87a is not inserted into the second opening 41. That is, the joining component 80 does not fall into the second opening 41. Thus, the joining component 80 can be held so as to be self-sustained against the first opening 31 and the second opening 41. In this state, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted, and then solidified again to be welded.

In the joining method, the joining body, the stator for rotating electric machine, and the method for manufacturing the stator for rotating electric machine according to embodiment 5 configured as described above, the same effects as in the above embodiments are naturally provided, and in addition, since the joining component has the flange portion, positioning of the joining component is facilitated. Further, when the joining component is inserted into the first opening and the second opening, the flange portion and the wire connection ring have contact with each other, whereby positioning in the axis direction of the joining component is achieved. As a result, a mechanism for the positioning or a sensor for detecting the height need not be provided on the facility side, and thus the facility cost can be reduced. In addition, since the positioning of the joining component can be performed on the joining body side, the assembly is facilitated.

Embodiment 6

Figure 14A:
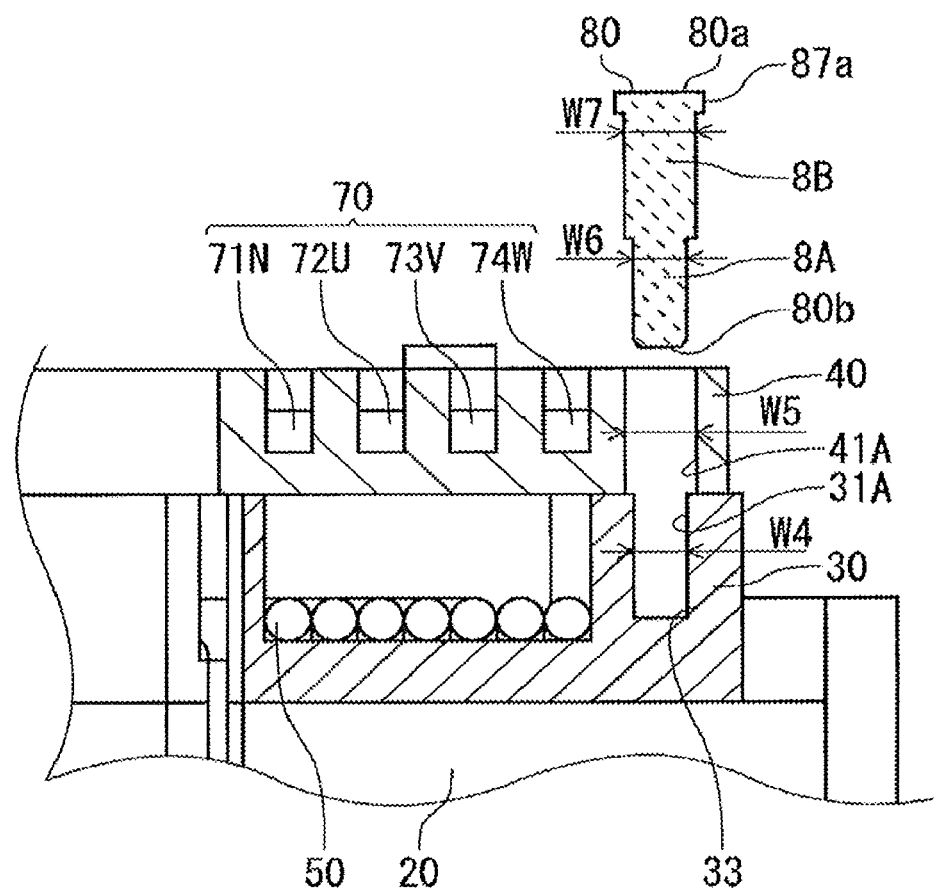
FIGS. 14(a) and 14(b) are sectional views showing the configuration of a stator (joining body) according to embodiment 6 of the present invention.
Figure 14B:
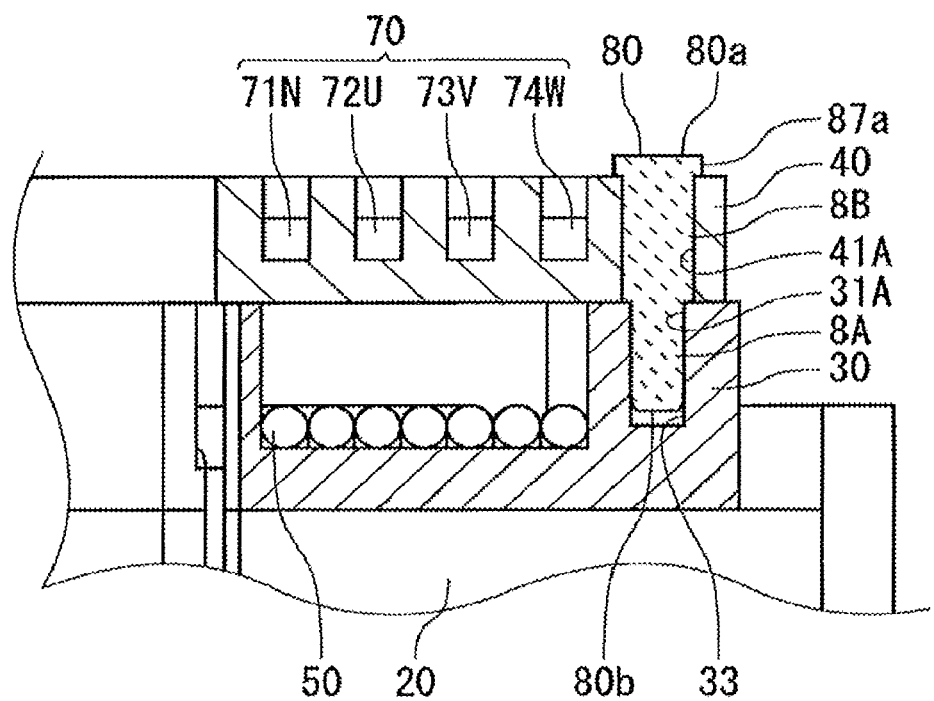

FIG. 14 is partial sectional views of a stator according to embodiment 6 of the present invention, respectively showing the state before the joining component is inserted into the first opening and the second opening and the state after the joining component is inserted to be joined. In the drawings, the components that are the same as those in the above embodiments are denoted by the same reference characters, and the description thereof is omitted. In the above embodiments, an example in which the opening sizes W1 and W2 of the first opening 31 and the second opening 41 are equal to each other has been shown. However, without limitation thereto, in the present embodiment 6, the case where a size W4 of a first opening 31A is smaller than a size W5 of a second opening 41A will be described.

As shown in FIG. 14(a), before the joining component 80 is inserted, a size W6 of a first insertion portion 8A to be inserted into the first opening 31A is slightly greater than the size W4 of the first opening 31A. In addition, similarly, a size W7 of a second insertion portion 8B to be inserted into the second opening 41A is slightly greater than the size W5 of the second opening 41A. Therefore, the size W6 of the first insertion portion 8A is smaller than the size W7 of the second insertion portion 8B.

To describe a specific example, before the joining component 80 is inserted, the size W4 of the first opening 31A is 2.3 mm, and the opening size W5 of the second opening 41A is 2.9 mm, and thus the opening size W5 of the second opening 41A is greater than the size W4 of the first opening 31A. The size W6 of the largest outer-shape part of the first insertion portion 8A of the joining component 80 is greater than the opening size W4 of the first opening 31A, and, for example, may be set at 2.6 mm. The size W7 of the largest outer-shape part of the second insertion portion 8B of the joining component 80 is greater than the opening size W5 of the second opening 41A, and, for example, may be set at 3.2 mm.

The same joining method as in the above embodiments is applied to the joining component 80 having the first insertion portion 8A and the second insertion portion 8B which respectively correspond to the first opening 31A and the second opening 41A having different opening sizes in embodiment 6 configured as described above. That is, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted to form welded parts.

In the joining method, the joining body, the stator for rotating electric machine, and the method for manufacturing the stator for rotating electric machine according to embodiment 6 configured as described above, even though the first opening and the second opening having different opening sizes are formed, since the joining component has the first insertion portion and the second insertion portion corresponding to the respective openings, the same effect as in the above embodiments can be provided.

Embodiment 7

Figure 15A:
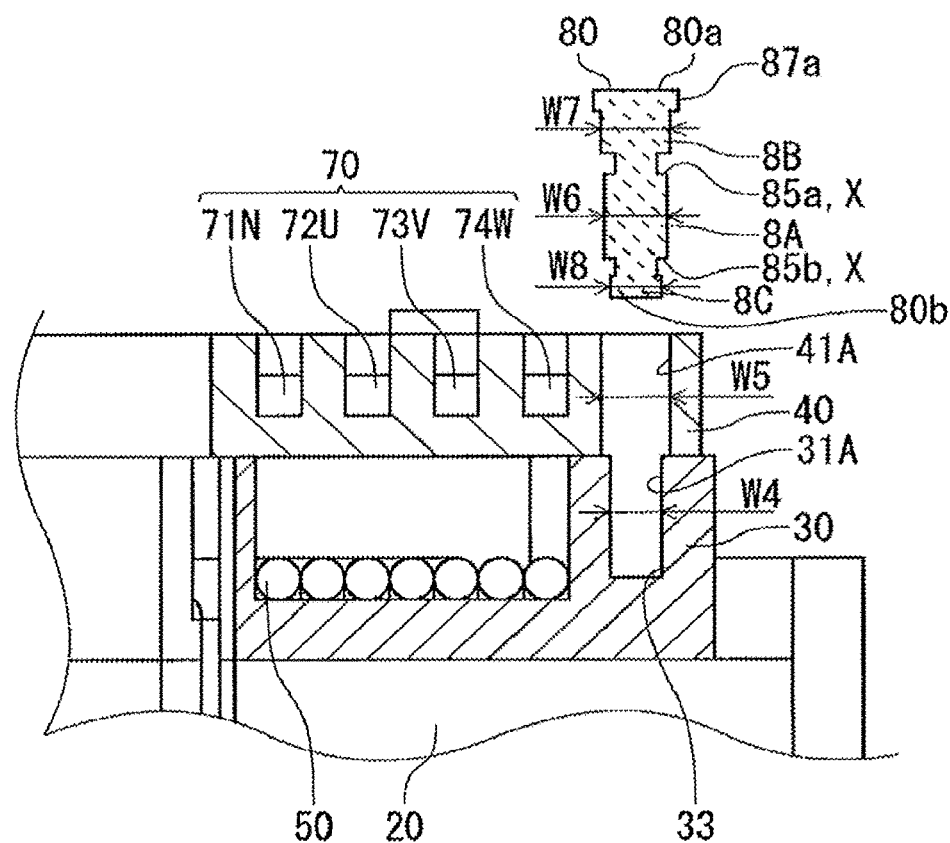
FIGS. 15(a) and 15(b) are sectional views showing the configuration of a stator (joining body) according to embodiment 7 of the present invention.
Figure 15B:
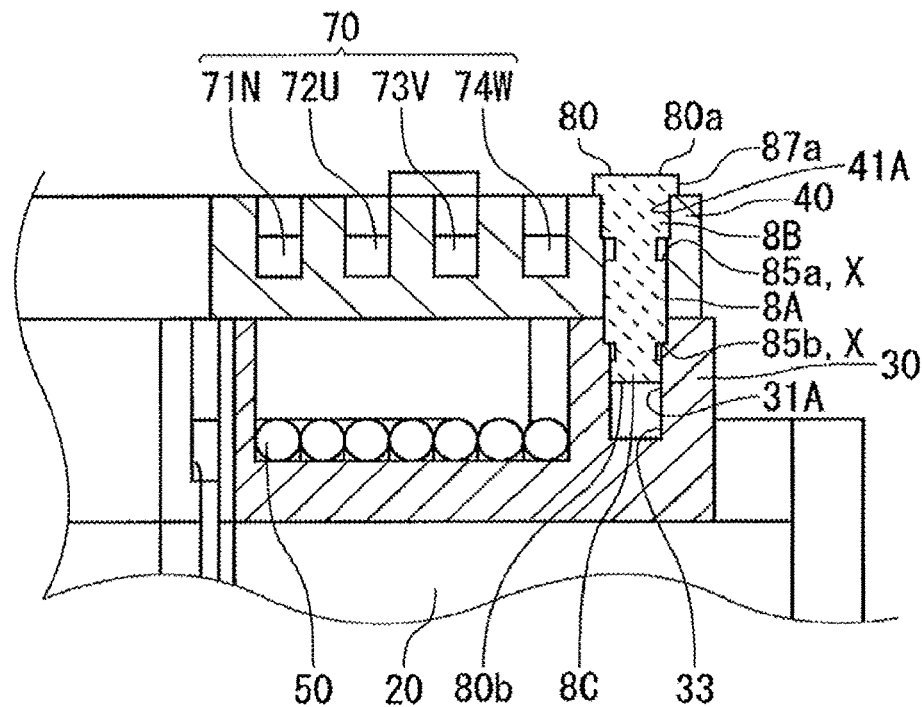
Figure 16:
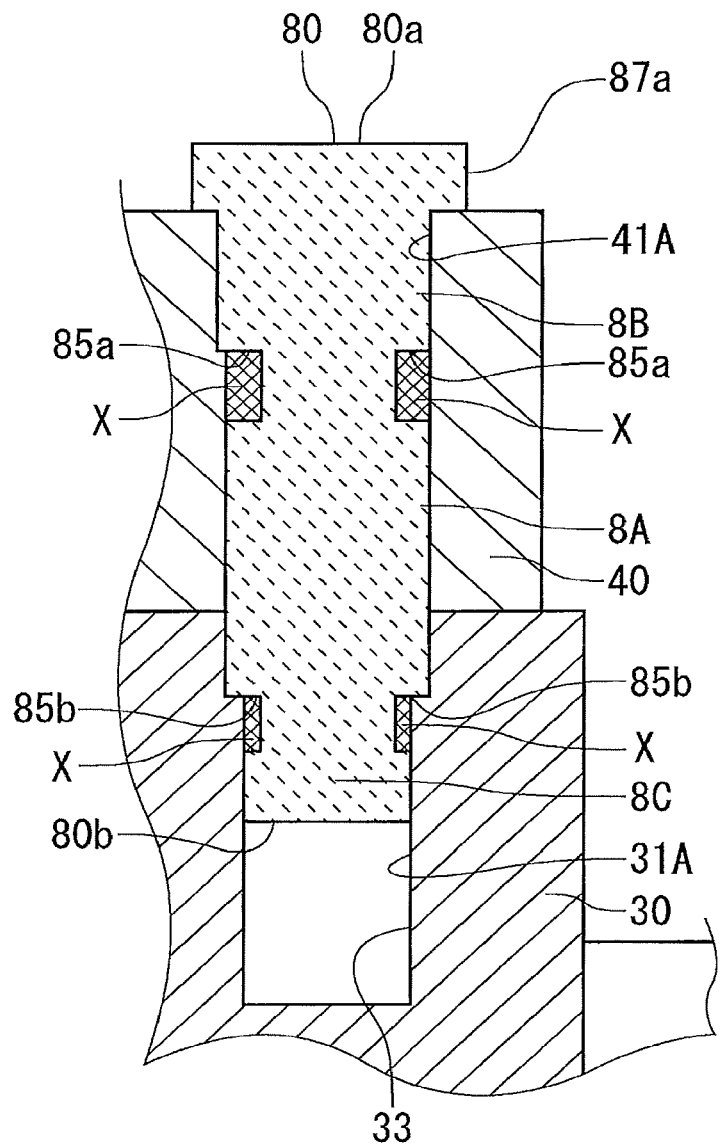
FIG. 16 is a perspective view showing the configuration of a joining component shown in FIGS. 15(a) and 15(b).
Figure 17:
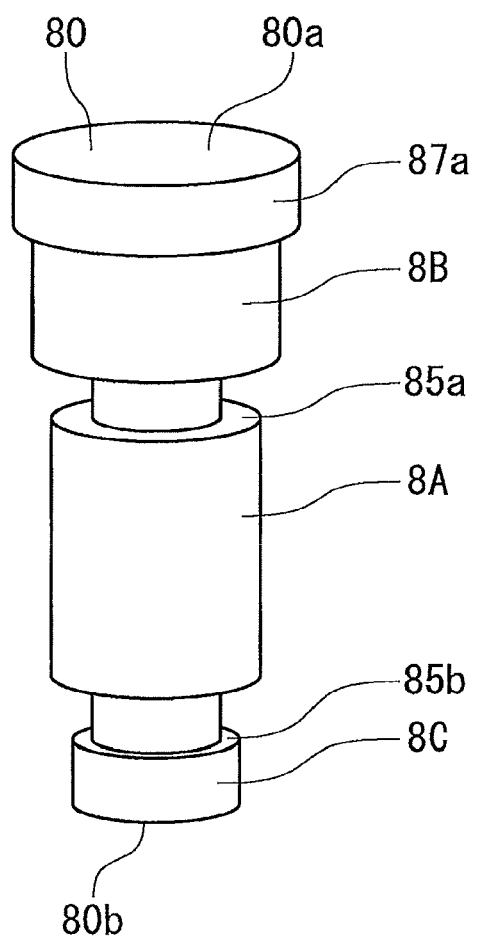
FIG. 17 is a sectional view illustrating welded parts in the stator (joining body) shown in FIGS. 15(a) and 15(b).

FIG. 15 is partial sectional views of a stator according to embodiment 7 of the present invention, respectively showing the state before the joining component is inserted into the first opening and the second opening and the state after the joining component is inserted to be joined. FIG. 16 is a partial sectional view showing the configuration of the stator shown in FIG. 15. FIG. 17 is a perspective view showing the configuration of the joining component shown in FIG. 15. In the drawings, the components that are the same as those in the above embodiments are denoted by the same reference characters, and the description thereof is omitted.

In the present embodiment 7, as in the above embodiment 6, the joining method in the case where the size W4 of the first opening 31A is smaller than the size W5 of the second opening 41A will be described. In the present embodiment 7, the joining component 80 is formed such that the size W6 part, i.e., the largest outer-shape part, of the joining component 80, that is to be inserted into the first opening 31A is formed so as to stride the first opening 31A and the second opening 41A.

Further, the joining component 80 has the recess/protrusion portion 85b formed as a groove along the outer circumferential direction and located below the first insertion portion 8A, of the joining component 80, that is to be inserted into the first opening 31A. In addition, between the first insertion portion 8A and the second insertion portion 8B, the joining component 80 has the recess/protrusion portion 85a formed as a groove along the outer circumferential direction. Therefore, welded parts X are formed at the recess/protrusion portions 85a and 85b of the joining component 80. A size W8 of a third insertion portion 8C formed below the recess/protrusion portion 85b is smaller than the size W6 of the first insertion portion 8A and is equal to the size W4 of the first opening 31A.

To describe a specific example, before the joining component 80 is inserted, as in the above embodiment 6, in the case where the size W4 of the first opening 31A is 2.3 mm, the opening size W5 of the second opening 41A is 2.9 mm, the size W6 of the first insertion portion 8A is 2.6 mm, and the size W7 of the second insertion portion 8B is 3.2 mm, the size W8 of the third insertion portion 8C is set at a value smaller than the size W6 of the first insertion portion 8A and equal to the size W4 of the first opening 31A, i.e., may be set at 2.3 mm, for example.

Thus, since the recess/protrusion portion 85b is formed and the third insertion portion 8C is formed below the recess/protrusion portion 85b, the melted thermoplastic resin material does not flow out downward from the third insertion portion 8C, but the thermoplastic resin material is likely to be accumulated at the recess side of the recess/protrusion portion 85b. In addition, since the size W8 of the third insertion portion 8C is equal to the size W4 of the first opening 31A, the joining component 80 can be smoothly inserted into the second opening 41A and the first opening 31A.

In embodiment 7 configured as described above, for the first opening 31A and the second opening 41A having different opening sizes, the same joining method as in the above embodiments is applied to the joining component 80 having the first insertion portion 8A, the second insertion portion 8B, and the third insertion portion 8C, the second insertion portion 8B being formed so as to stride the first opening 31A and the second opening 41A. Thus, the joining component 80 is vibrated by an ultrasonic wave or a high-frequency wave. Then, due to friction between the joining component 80 and each of the wire connection ring 40 and the insulation holder 30, the thermoplastic resin materials of the wire connection ring 40 and the insulation holder 30 are melted at the protrusion sides of the recess/protrusion portions 85a and 85b.

Then, as shown in FIG. 16, the melted thermoplastic resin materials of the wire connection ring 40 and the insulation holder 30 flow into the recess sides of the recess/protrusion portions 85a and 85b on the surface. Then, the thermoplastic resin having flowed therein is solidified to be welded. Thus, welded parts X are formed in the recess/protrusion portions 85a and 85b.

Figure 18:
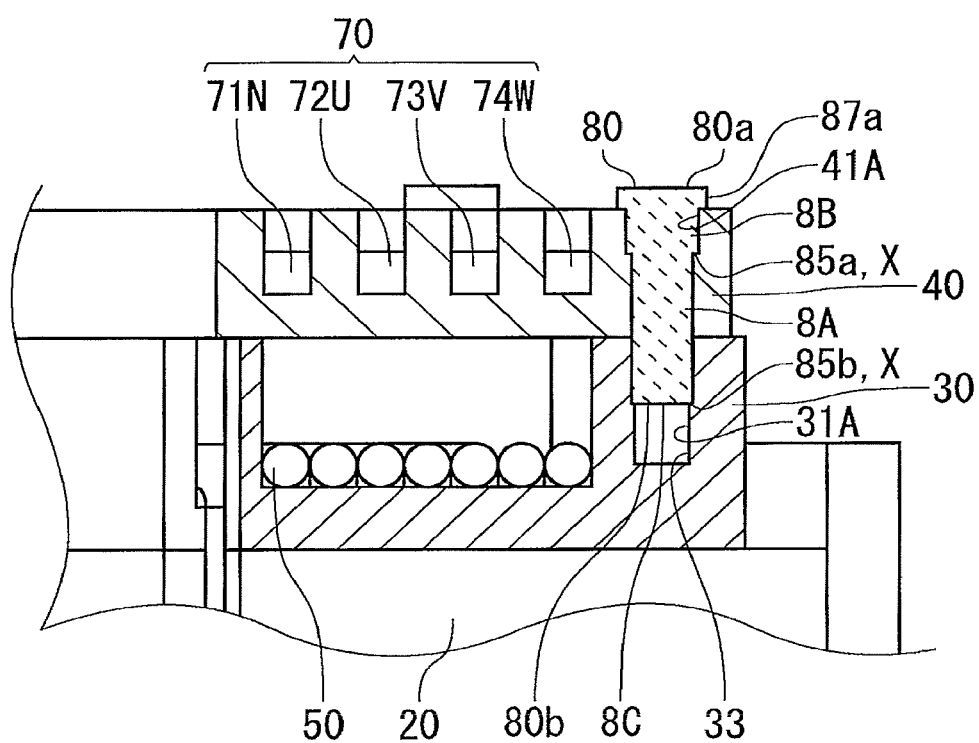
FIG. 18 is a sectional view showing the configuration of another stator (joining body) according to embodiment 7 of the present invention.
Figure 19:
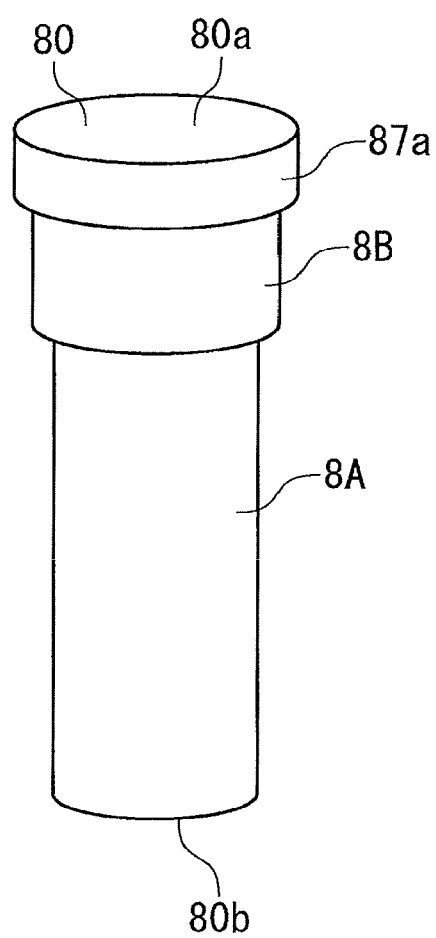
FIG. 19 is a perspective view showing the configuration of a joining component shown in FIG. 18.

In the above embodiment 7, an example in which the recess/protrusion portions 85a and 85b are formed has been shown. However, without limitation thereto, as shown in FIG. 18 and FIG. 19, it is possible that the recess/protrusion portions 85a and 85b are not formed. In this case, the first insertion portion 8A is formed so as to stride the first opening 31A and the second opening 41A, without the third insertion portion 8C being formed.

In the joining method, the joining body, the stator for rotating electric machine, and the method for manufacturing the stator for rotating electric machine according to embodiment 7 configured as described above, the same effects as in the above embodiments are naturally provided, and in addition, since the first insertion portion which is the largest outer-shape part to be inserted into the first opening is formed at such a position as to stride the first opening and the second opening, it is possible to sufficiently cope with even the case where the first resin component and the second resin component are separated from each other.

It is noted that, within the scope of the present invention, the above embodiments may be freely combined with each other, or each of the above embodiments may be modified or simplified as appropriate.

The invention claimed is:

1. A joining body comprising:
    a first resin component formed of a thermoplastic resin material and having a first opening;
    a second resin component formed of a thermoplastic resin material and having a second opening;
    a joining component configured to be inserted consecutively in the first opening of the first resin component and the second opening of the second resin component, the joining component being formed of a metal material having a higher melting point than those of the thermoplastic resin materials, the joining component having a higher stiffness than those of the first resin component and the second resin component, wherein a pocket portion into which the joining component is not inserted is the lower end side of the first opening, wherein
    a lower end of the pocket portion, and a lower end of the joining component are spaced apart from each other; and
    a welded part is formed by welding in at least a part of an area where each of the first resin component and the second resin component has contact with the joining component.

2. The joining body according to claim 1, wherein the joining component has a recess/protrusion portion formed on a surface thereof, and the welded part is formed at the recess/protrusion portion.

3. The joining body according to claim 2, wherein the recess/protrusion portion of the joining component is formed at both of parts of the joining component that correspond to inside of the first opening and inside of the second opening.

4. The joining body according to claim 2, wherein
the recess/protrusion portion of the joining component is formed in a diamond knurl shape or a straight knurl shape, or in a groove shape along an outer circumferential direction.

5. The joining body according to claim 1, wherein
a front end portion and a rear end portion of the joining component are located in the first opening and the second opening, respectively.

6. The joining body according to claim 1, wherein
a rear end portion of the joining component is formed to be a flange portion greater than an opening size of the second opening, and
the flange portion of the joining component is formed so as to remain outside the second opening.

7. The joining body according to claim 1, wherein
the first opening has a step having a smaller opening diameter than that at a side contiguous with the second opening, and
an outer shape of the joining member is formed in contact with the first opening at a second opening side with respect to the step of the first opening.

8. A joining body comprising:
a first resin component formed of a thermoplastic resin material and having a first opening;
a second resin component formed of a thermoplastic resin material and having a second opening;
a joining component configured to be inserted consecutively in the first opening of the first resin component and the second opening of the second resin component, the joining component being formed of a metal material having a higher melting point than those of the thermoplastic resin materials, the joining component having a higher stiffness than those of the first resin component and the second resin component, wherein a pocket portion into which the joining component is not inserted is the lower end side of the first opening; and
a welded part is formed by welding in at least a part of an area where each of the first resin component and the second resin component has contact with the joining component,
the first opening has a step having an opening diameter smaller than an opening diameter on a side connected to the second opening,
an outer shape of the joining component is formed to have contact with the first opening on the second opening side from the step of the first opening,
the joining component has a groove along an outer circumferential direction, below a largest outer-shape part of the joining component that is inserted into the first opening,
a diameter of the joining component at a position where the groove is formed is smaller than the opening diameter of the step of the first opening,
wherein a lower end of the pocket portion and a lower end of the joining component are spaced apart from each other, and
the welded part is formed at the groove of the joining component.

* * * * *